US 9,137,370 B2

(12) United States Patent
Elkington et al.

(10) Patent No.: US 9,137,370 B2
(45) Date of Patent: Sep. 15, 2015

(54) CALL CENTER INPUT/OUTPUT AGENT UTILIZATION ARBITRATION SYSTEM

(75) Inventors: David R Elkington, Springville, UT (US); Thomas Purdy, Springville, UT (US); Daniel E. Telschow, Spanish Fork, UT (US)

(73) Assignee: InsideSales.com, Provo, UT (US)

( * ) Notice: Subject to any disclaimer, the term of this patent is extended or adjusted under 35 U.S.C. 154(b) by 0 days.

(21) Appl. No.: 13/468,030

(22) Filed: May 9, 2012

(65) Prior Publication Data
US 2013/0121484 A1 May 16, 2013

Related U.S. Application Data

(60) Provisional application No. 61/484,201, filed on May 9, 2011.

(51) Int. Cl.
| H04M 3/00 | (2006.01) |
| H04M 5/00 | (2006.01) |
| H04M 3/523 | (2006.01) |
| H04M 3/51 | (2006.01) |
| H04M 7/00 | (2006.01) |

(52) U.S. Cl.
CPC .............. H04M 3/5232 (2013.01); H04M 3/51 (2013.01); H04M 7/0024 (2013.01)

(58) Field of Classification Search
CPC . H04M 3/523; H04M 3/5183; H04M 3/5233; H04M 3/5232
USPC ............................ 379/265.02, 265.04, 265.05
See application file for complete search history.

(56) References Cited

U.S. PATENT DOCUMENTS

| 5,095,505 | A | 3/1992 | Finucane et al. |
| 5,241,586 | A | 8/1993 | Wilson et al. |
| 5,274,699 | A | 12/1993 | Ranz |
| 5,392,345 | A * | 2/1995 | Otto .......................... 379/266.09 |
| 5,590,184 | A | 12/1996 | London |
| 5,740,538 | A | 4/1998 | Joyce et al. |
| 5,901,209 | A | 5/1999 | Tannenbaum et al. |
| 5,974,135 | A | 10/1999 | Breneman et al. |
| 6,049,602 | A * | 4/2000 | Foladare et al. ......... 379/265.04 |
| 6,185,194 | B1 | 2/2001 | Musk et al. |
| 6,192,123 | B1 | 2/2001 | Grunsted et al. |
| 6,326,962 | B1 | 12/2001 | Szabo |
| 6,343,120 | B1 | 1/2002 | Rhodes |
| 6,470,386 | B1 | 10/2002 | Combar et al. |
| 6,611,498 | B1 | 8/2003 | Baker et al. |
| 6,643,363 | B1 | 11/2003 | Miura |
| 6,661,882 | B1 | 12/2003 | Muir et al. |
| 6,662,006 | B2 | 12/2003 | Glass |
| 6,684,336 | B1 | 1/2004 | Banks et al. |
| 6,690,672 | B1 | 2/2004 | Klein |
| 6,714,535 | B1 | 3/2004 | Herh |
| 6,731,609 | B1 | 5/2004 | Hirni et al. |
| 6,816,880 | B1 | 11/2004 | Strandberg et al. |

(Continued)

Primary Examiner — Nafiz E Hoque
(74) Attorney, Agent, or Firm — Echelon IP LLC; Everett D. Robinson

(57) ABSTRACT

Disclosed herein are systems and methods that provide for maintenance of the status of availability of call-center agents through the use of local arbitration between processes and applications that may interact with more than one resource of telephone contacts between differing activities or work for these call-center agents. Detailed information on various example embodiments of the inventions are provided in the Detailed Description below, and the inventions are defined by the appended claims.

11 Claims, 11 Drawing Sheets

(56) References Cited

U.S. PATENT DOCUMENTS

| | | |
|---|---|---|
| 6,834,048 B1 | 12/2004 | Cho et al. |
| 6,865,599 B2 | 3/2005 | Zhang |
| 6,870,828 B1 | 3/2005 | Giordano, III |
| 6,941,159 B2 | 9/2005 | Tsai et al. |
| 6,961,756 B1 | 11/2005 | Dilsaver et al. |
| 6,975,718 B1 | 12/2005 | Pearce et al. |
| 7,020,256 B2 | 3/2006 | Jain et al. |
| 7,027,575 B1 | 4/2006 | Burgess |
| 7,062,475 B1 | 6/2006 | Szabo et al. |
| 7,099,445 B2 | 8/2006 | Creamer et al. |
| 7,152,051 B1 | 12/2006 | Commons et al. |
| 7,218,721 B1 | 5/2007 | Vincent et al. |
| 7,242,760 B2 * | 7/2007 | Shires ............... 379/265.01 |
| 7,280,646 B2 | 10/2007 | Urban et al. |
| 7,376,228 B2 | 5/2008 | Haug, Jr. et al. |
| 7,546,630 B2 | 6/2009 | Tabi |
| 7,680,892 B2 | 3/2010 | Knox et al. |
| 7,684,554 B1 | 3/2010 | Vincent et al. |
| 7,739,335 B2 | 6/2010 | Siegel et al. |
| 7,756,253 B2 | 7/2010 | Breen et al. |
| 7,805,523 B2 | 9/2010 | Mitchell et al. |
| 7,899,169 B2 | 3/2011 | Siminoff |
| 7,925,003 B2 | 4/2011 | Haug, Jr. et al. |
| 8,019,875 B1 | 9/2011 | Nielsen |
| 8,020,104 B2 | 9/2011 | Robarts et al. |
| 8,027,332 B1 | 9/2011 | Martin et al. |
| 8,040,875 B2 | 10/2011 | Barclay et al. |
| 8,078,605 B2 | 12/2011 | Telschow et al. |
| 8,195,504 B2 | 6/2012 | Merrifield, Jr. et al. |
| 8,325,738 B2 | 12/2012 | Purdy et al. |
| 8,352,389 B1 | 1/2013 | Martinez et al. |
| 8,510,382 B2 | 8/2013 | Purdy et al. |
| 8,566,419 B2 | 10/2013 | Purdy et al. |
| 8,775,332 B1 | 7/2014 | Morris et al. |
| 8,788,439 B2 | 7/2014 | Martinez et al. |
| 8,812,417 B2 | 8/2014 | Martinez et al. |
| 2002/0018547 A1 | 2/2002 | Takae et al. |
| 2002/0061100 A1 | 5/2002 | DiCamillo et al. |
| 2002/0065920 A1 | 5/2002 | Siegel et al. |
| 2002/0080942 A1 | 6/2002 | Clapper |
| 2002/0082892 A1 | 6/2002 | Raffel et al. |
| 2002/0090964 A1 | 7/2002 | Harder |
| 2002/0122541 A1 | 9/2002 | Metcalf |
| 2002/0131561 A1 | 9/2002 | Gifford et al. |
| 2002/0146111 A1 | 10/2002 | Hayashi |
| 2002/0184364 A1 | 12/2002 | Brebner |
| 2003/0007616 A1 | 1/2003 | Alves et al. |
| 2003/0081591 A1 | 5/2003 | Cheung et al. |
| 2003/0088619 A1 | 5/2003 | Boundy |
| 2003/0147519 A1 | 8/2003 | Jain et al. |
| 2003/0177017 A1 | 9/2003 | Boyer et al. |
| 2003/0202649 A1 | 10/2003 | Haug, Jr. et al. |
| 2004/0017899 A1 | 1/2004 | Garfinkel et al. |
| 2004/0023644 A1 | 2/2004 | Montemer |
| 2004/0071281 A1 | 4/2004 | Rashid |
| 2004/0098493 A1 | 5/2004 | Rees |
| 2004/0102994 A1 | 5/2004 | Boppana |
| 2004/0102996 A1 | 5/2004 | Boppana |
| 2004/0128184 A1 | 7/2004 | Bracken et al. |
| 2004/0133447 A1 | 7/2004 | Boppana |
| 2004/0266415 A1 | 12/2004 | Belkin et al. |
| 2005/0015601 A1 | 1/2005 | Tabi |
| 2005/0053213 A1 | 3/2005 | Giannoit |
| 2005/0066011 A1 | 3/2005 | Wicks |
| 2005/0091059 A1 | 4/2005 | Lecoeuche |
| 2005/0172232 A1 | 8/2005 | Wiseman |
| 2005/0190908 A1 | 9/2005 | Haug, Jr. et al. |
| 2006/0062373 A1 * | 3/2006 | Chervets et al. ......... 379/265.03 |
| 2006/0104433 A1 | 5/2006 | Simpson et al. |
| 2006/0140200 A1 | 6/2006 | Black et al. |
| 2006/0206517 A1 | 9/2006 | Hyder et al. |
| 2007/0005762 A1 | 1/2007 | Knox et al. |
| 2007/0005776 A1 | 1/2007 | Hansen et al. |
| 2007/0064895 A1 | 3/2007 | Wong et al. |
| 2007/0136789 A1 | 6/2007 | Fotta et al. |
| 2007/0250841 A1 | 10/2007 | Scahill et al. |
| 2007/0263819 A1 | 11/2007 | Finkelman et al. |
| 2008/0089501 A1 | 4/2008 | Benco et al. |
| 2008/0298560 A1 | 12/2008 | Purdy et al. |
| 2008/0313277 A1 | 12/2008 | Altberg et al. |
| 2009/0100137 A1 | 4/2009 | Venkitaraman et al. |
| 2009/0100139 A1 | 4/2009 | Purdy et al. |
| 2009/0154686 A1 | 6/2009 | Purdy et al. |
| 2009/0170480 A1 | 7/2009 | Lee |
| 2009/0240561 A1 | 9/2009 | Altberg et al. |
| 2010/0082801 A1 | 4/2010 | Patel et al. |
| 2010/0088290 A1 | 4/2010 | Telschow et al. |
| 2010/0226490 A1 * | 9/2010 | Schultz et al. ......... 379/265.09 |
| 2011/0211572 A1 | 9/2011 | Campion et al. |
| 2011/0213741 A1 | 9/2011 | Shama et al. |
| 2013/0121484 A1 | 5/2013 | Elkington et al. |
| 2014/0052678 A1 | 2/2014 | Martinez et al. |
| 2014/0114997 A1 | 4/2014 | Purdy et al. |
| 2014/0143344 A1 | 5/2014 | Purdy et al. |
| 2014/0180975 A1 | 6/2014 | Martinez et al. |
| 2014/0180978 A1 | 6/2014 | Martinez et al. |
| 2014/0279739 A1 | 9/2014 | Elkington et al. |

\* cited by examiner

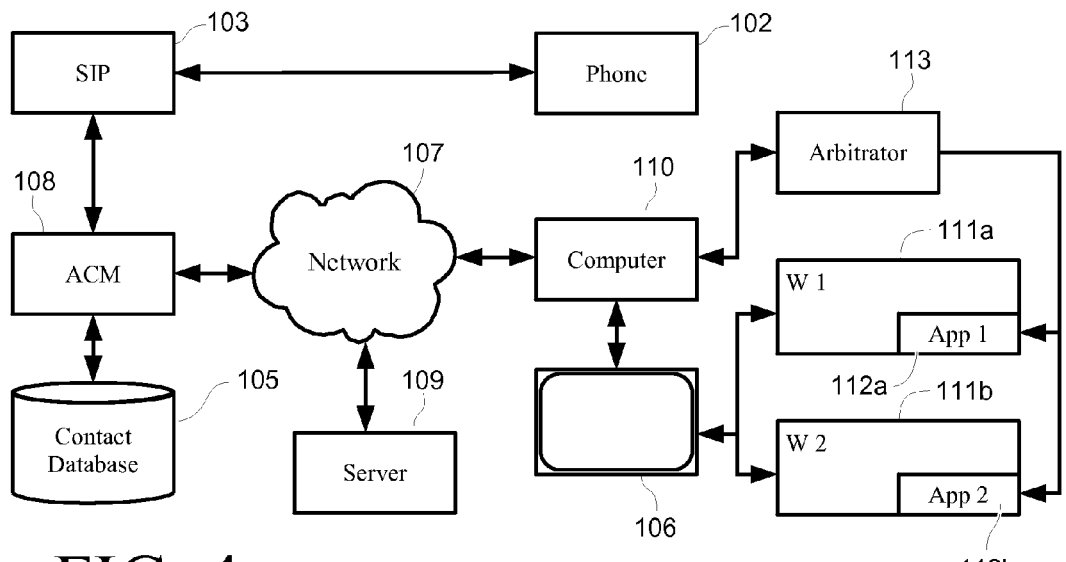
FIG. 4
FIG. 5
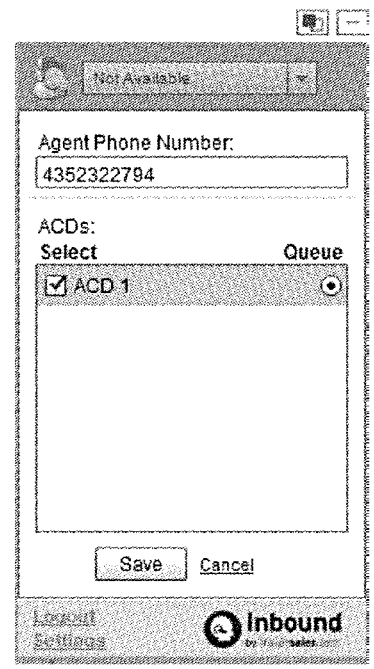
FIG. 6

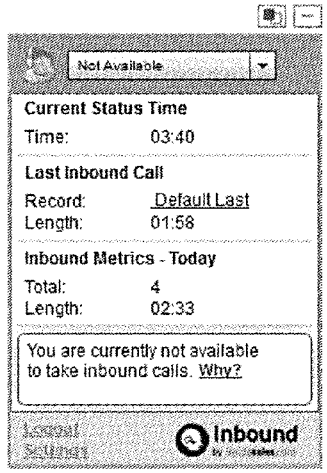
FIG. 7
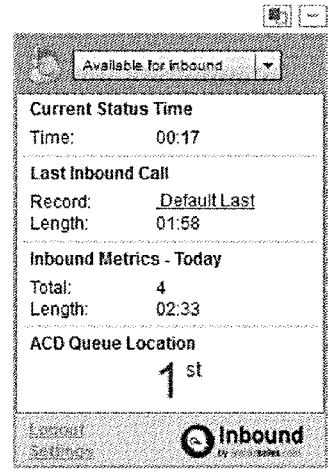
FIG. 8
FIG. 9
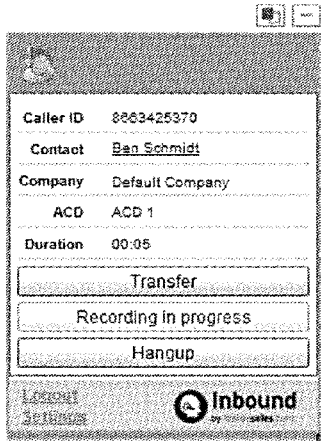
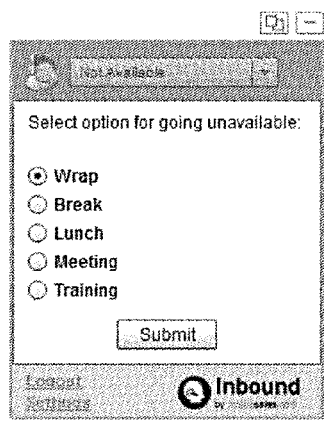
FIG. 10
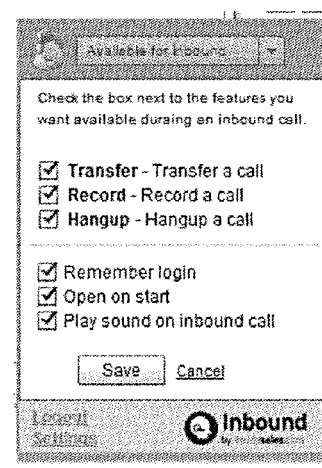
FIG. 11

CALL CENTER INPUT/OUTPUT AGENT UTILIZATION ARBITRATION SYSTEM

CROSS-REFERENCE TO RELATED APPLICATIONS

This application claims the benefit of U.S. Provisional Application No. 61/484,201, filed May 9, 2011, which is incorporated by reference in its entirety.

BACKGROUND

Persons have been hired for many years to operate telephonic equipment in connection in a variety of business activities. These activities have included bill collection, the placement of orders from customers, the taking of surveys, providing customer assistance, registration of persons for classes and events, the providing of medical and legal assistance to the public, and many others. Such persons have traditionally worked from a call center, which is ordinarily a room containing equipment designed for these persons to speak with others such that they aren't required to travel to the center itself. Today, call centers are less and less confined to a single room or building, and those working within a call center are more frequently located at multiple sites and even sometimes across the world. Call centers sometimes even now include locations within employee residences where network access is available.

Those working within call centers are ordinarily agents for a business, sometimes referred to as call service agents, or hereinafter just agents. Traditionally all that has been required for these agents to perform their work has been a telephone and some form of informational carriage such as book of membership or a pad of paper. However, with the advance and availability of computer technology, the work of these agents as been made more efficient.

The computer setup for a call center agent has varied widely, but the discussion will now reference one kind of exemplary setup as an introduction for the inventions presented herein. Now referring to FIG. 1, the components of the exemplary setup for call center agent 101 include a telephone 102, which enables agent 101 to place and/or receive telephone calls by way of SIP equipment 103, utilizing the Session Initiation Protocol in this more modern example. It is to be understood that the use of SIP equipment is merely one convenient example; other kinds of equipment may be used equally well including ordinary telephone service, videoconferencing service, radio, network chat sessions, or any other means of interactive communication between an agent and a distant person. However, for simplicity, the discussion hereinafter will reference telephones to include any kind of interactive distant communication between an agent and a remote party.

The exemplary setup also includes computer interface equipment 106, by which agent 101 may interact with a computer system. That system could include a monitor, a keyboard, a printer, or any other means of providing to or receiving from the agent data in conjunction with calls involving the agent. For example, agent 101 might be engaged in the placing of calls for a survey. Displayed on equipment 106 might be the telephone number being called and the name of the person assigned thereto. If there is a directory available including further information, equipment 106 might provide further information such as for a particular person being contacted, their name, their age, their sex, an account number, a history of interaction, etc. Thus, equipment 106 may facilitate the interaction with a remote person being called such that that person's information need not be requested during the call itself.

Displayed on equipment 106 might also be information of an incoming caller. This display might be called up by the agent 101 upon asking for identification of a caller, or it might be linked to equipment that pulls up such caller information automatically upon receipt of an identity associated with an incoming call, such as a telephone number. In the setup of FIG. 1, SIP equipment 103 is linked to a computer 104, whereby incoming telephone numbers may be transmitted for lookup. Upon receipt of a telephone number, computer 104 performs a lookup in a contact database 105, displaying on equipment 106 for the agent 101 information related to a person or persons likely to be calling in from that telephone number. Having such information displayed, agent 101 can confirm the identity of the caller and avoid unnecessary questioning.

Thus, setups such as the one shown in FIG. 1 can facilitate the activities of a call center agent and more efficiently utilize his time and that of remote persons calling in or being called. The systems and methods disclosed herein provide further functionality, options and efficiencies to prior call center systems, which will become apparent from the discussion below.

BRIEF SUMMARY

Disclosed herein are systems and methods that provide for maintenance of the status of availability of call-center agents through the use of local arbitration between processes and applications that may interact with more than one resource of telephone contacts between differing activities or work for these call-center agents. Detailed information on various example embodiments of the inventions are provided in the Detailed Description below, and the inventions are defined by the appended claims.

BRIEF DESCRIPTION OF THE DRAWINGS

FIG. 4 shows a configuration for a call-center agent setup that utilizes more than one automated call manager and arbitration of calls for an agent.

FIG. 5 shows an exemplary interaction window.
FIG. 6 shows an exemplary interaction window.
FIG. 7 shows an exemplary interaction window.
FIG. 8 shows an exemplary interaction window.
FIG. 9 shows an exemplary interaction window.
FIG. 10 shows an exemplary interaction window.
FIG. 11 shows an exemplary interaction window.
FIG. 15 shows an exemplary interaction window.
FIG. 19 shows an exemplary interaction window.

Reference will now be made in detail to particular implementations of the various inventions described herein in their various aspects, examples of which are illustrated in the accompanying drawings and in the detailed description below.

DETAILED DESCRIPTION

Figure 2:
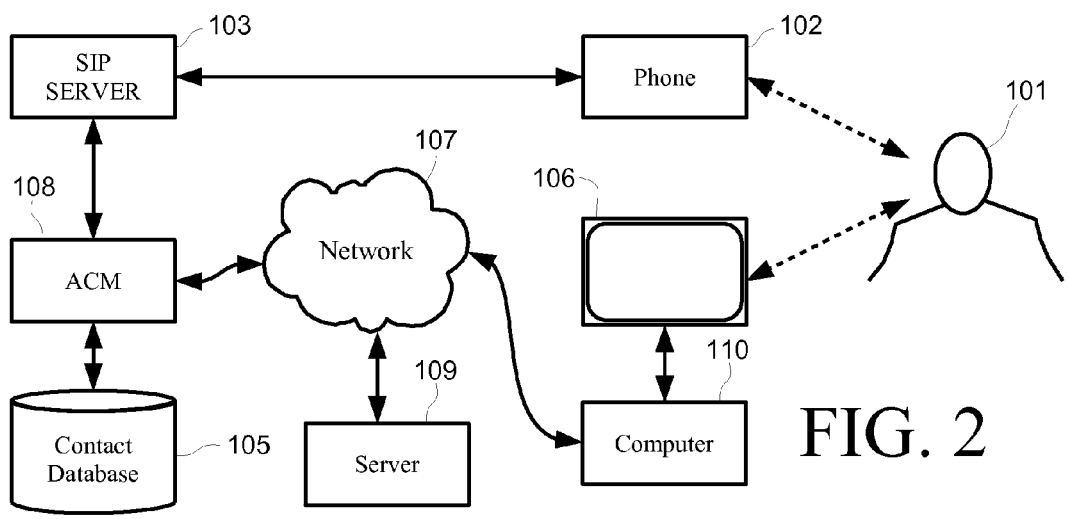
FIG. 2 shows the elements of a call-center agent setup for more than one location.

Now turning to FIG. 2, call center setups can be configured to utilize more than one room or location. The interaction of an agent 101 is substantially the same, as he continues to interact with telephonic equipment 102 and interfacing equipment 106. In this configuration, however, the functions of computer 104 are now divided between an agent's computer 110 and an automated call manager (ACM) 108, through the use of a network 107. Computer 110 may be a computer in the conventional sense, having a display, a keyboard, an operating system, etc., but it is to be understood that computer 110 is merely representative of a terminal which agent 101 may use in conjunction with ACM 108. Computer 110 could be replaced with a tablet, a smartphone, etc., so long as an agent terminal is present having a display and an input device, may receive and execute instructions that are stored somewhere in the system. Computer 110 can be configured in a limited way to serve the purposes of the call center, however in a preferred configuration call center functions can be implemented within an application executing on the computer. Thus, the computer 110 could be specifically configured to run only the call center software, configured to run other applications such as company email or accounting software, or configured as a personal computer or other computing device for agent 101 as desired.

However, the system of FIG. 2 permits the integration of several agent computers 110 with a common database 105 that can be shared and kept current. Thus, when one user makes contact with a person in database 105, that contact and any effects thereof can be updated therein, preventing duplication of work between multiple agents without the division of pools of contacts or customers. Thus, ACM 108 may communicate with sets comprising an agent 101, his computer 110, and his telephonic equipment 103 used through the course of the agent's work. In this example, ACM 108 communicates with each computer 110 through a network 107, and thus each computer 110 can be located separately from the others, even to the point that a computer 110 could be located in its own room or agent residence maintaining a connection over the Internet. Hereinafter it is to be understood that an ACM may access a contact database and agent computers distantly through network services if so desired.

Figure 1:
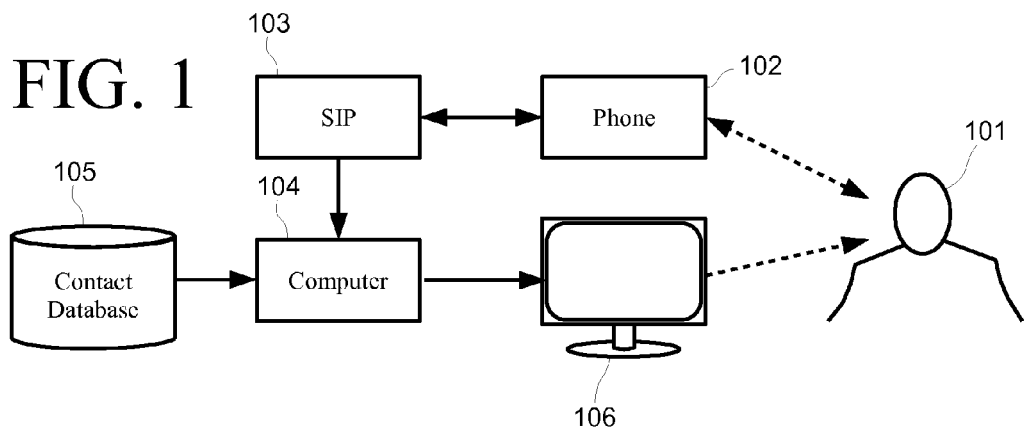
FIG. 1 shows the elements of a conventional call-center agent setup.

Incoming and outgoing calls are fairly straightforward in a system without an Automated Call Manager, such as that of FIG. 1. In such a system, an agent may be located to a telephone station having a unique telephone number assigned either for incoming calls or for the transfer of incoming calls, and outgoing calls may be placed in the ordinary way. A system with an ACM may operate in a more sophisticated way. A system may have, for example, a common telephone number for a call center, with a pool of agents available at any given time for the transfer of incoming telephone calls. ACM 108 may cooperate with a telephonic server 103 utilizing the SIP protocol, which ACM causes server 103 to forward incoming telephone calls to agent telephones 102 in accordance with information known about the present availability of agents. Server 103 may also manage the placement of outgoing phone calls through entry of a telephone number by the agent 101, but preferably the placement of outbound calls is by way of a command made to the interface 106, the command transmitted in association with a contact to ACM 108, which delivers the necessary telephone number to server 103 for initiation of a telephone call.

In a system such as that shown in FIG. 2, computer 110 may communicate with an ACM by way of static software installed on the computer. However, that is not required. In some circumstances it will be desirable to maintain control of the agent's software remotely, and thus a server 109 may be provided allowing agent 101 to access an ACM 108. This may be performed, for example, through the use of access by an agent to the server through a web browser, which might deliver the software for accessing ACM in the form of a program executable in the browser by an interpreter installed on computer 110. In this way, updates to the agent software can be distributed merely by installing to the server 109.

Thus, in a preferred method, the agent begins his efforts in the call center by accessing a server 109 at a pre-defined URL, which may be specific to the ACM to be accessed. In response, the server 109 may deliver instructions executable on the agent's computer 110, which are then executed, for example, within the agent's browser. In the course of that execution, the user is presented an entry for his identity, and upon validating him he may begin to interact with the call center platform. That interaction may include the connection of phone 102 to server 103, allowing for telephone conversations both incoming or outgoing.

Upon validation, the agent may be presented with information upon interface 106 disclosing to him the information of an incoming contact. Thus, if phone 102 is ringing or otherwise notifying of an incoming call, information concerning the identity of the individual on the other side of the call, the purpose of the call, the history and reputation of the caller, and many other informational items may be presented to the agent specific to the caller through software delivered from server 109.

Similarly, the agent may be directed by the ACM and/or the call center software to engage in outgoing contact activity. The software may present to the agent 106 a list of contacts to be called, information about the persons to be called, potentially prioritized for the efficiency of the agent. The agent may interact with software operating upon interface 106 and computer 110, retrieving new activities to perform from ACM, which activities may be informed by the contact database 105. Upon the entry of a command to interface 106, a connection to a contact may be initiated upon sever 103 and phone 102.

As calls are initiated and terminated to agent 101 and outside persons, ACM 108 may be notified from server 103. As such notifications are received, ACM 108 may maintain state information as to the state of agents 101, that is idle, on a call, not logged in, engaged in a break, etc. Thus, when agent 101 completes a call with an outside party, he may be prompted upon display 106 for the outcome of the conversation, and his display updated with a new contact to engage.

Although it may be desired to focus agents upon either incoming or outgoing calls, in some situations it may be desired to engage agents in both. In one example, it may be that the incoming calls are sporadic, leaving some agents idle if activities other than the receipt of incoming calls are not allowed. Thus, an ACM could assign incoming calls to those agents that aren't presently engaged in an outgoing call. This permits a more effective utilization of agent personnel. To enable such utilization of agent personnel, handling both incoming and outgoing calls, agent state may be maintained at the ACM such that polling or test-forwarding of incoming calls to agent computers is not required.

However, a system employing one ACM connected to one contact database might still idle agents during times when there is little outgoing call work. An agent might be exposed only to a single customer contact database, bounding the work that he can do. A more sophisticated call center setup might be fashioned such as the one of FIG. 3, having two ACMs 108a and 108b each connected to a single database. Now it is to be understood that a single ACM might service more than one contact database, and the limitation of one database to one ACM presented here is merely for illustration. However, in such a setup the software run on agent computer 110 would ordinarily maintain a separation between the treatment of contact databases, each maintaining its own scripts and informational forms for agents 101 to handle. Such a separation might be maintained by running two separate physical ACMs, two processes running on the same computer each presenting an ACM to outside agent computers, or even a single software process and/or suite presenting a separate customer setup or contact database, or other configurations varied as will be understood by one of ordinary skill.

Figure 3:
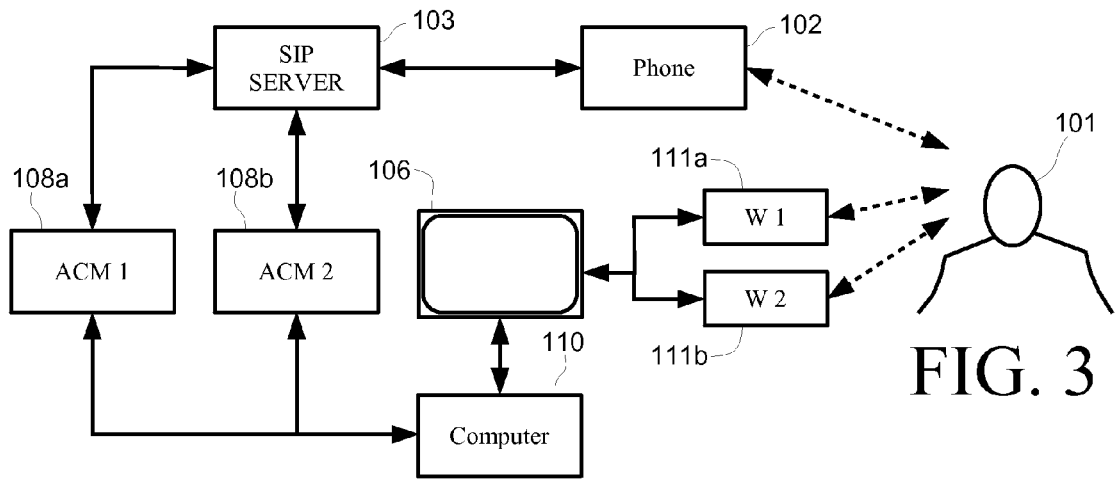
FIG. 3 shows a configuration for a call-center agent setup that utilizes more than one automated call manager.

Continuing further in the example of FIG. 3, the software provided to the agent 101 operates more than one interface, which in this case are windows 111a and 111b. In this example, each is a separate browser window or tab, each window or tab running a separate instance of software provided to communicate with one of ACMs 108a and 108b. Thus, in this configuration agent 101 can wait for an incoming call for either of the databases associated with ACMs 108a and 108b, forwarded through the phone 102 and telephonic infrastructure 103 assigned to the agent. If there is no incoming call to handle, agent 101 can engage in outgoing call work available through either of ACMs 108a or 108b as may be the case.

However, in the handling of incoming contacts, the setup of FIG. 3 can have certain inefficiencies. Potentially, each of ACMs 108a and 108b can have multiple agents registered thereon, and thus when incoming contacts arrive one ACM may not have any agent's true state with respect to the other ACMs to which that agent is registered. In such a multiple-ACM system, one handling an incoming call is left to query the other available ACMs, the telephonic equipment registered, or the agents' computers for agent status, or the system must propagate agent status throughout the network requiring each ACM to have maintained within the configuration of the entire system. Although this is quite possible to do, it does not leave open the possibility of independent ACMs gracefully maintained by independent entities.

A more graceful procedure of the maintenance of agent status is now presented herein. Now turning to FIG. 4, a call center setup can be constructed that maintains and coordinates agent status between an agent computer 110 and an ACM 108. Although FIG. 4 depicts only one ACM and one agent computer, it is to be understood that this configuration can be expanded to as many agents, ACMs and databases as desired, and that these limitations are limitations of depiction and not implementation. Even so, the differences between this system and that of FIG. 3 are of importance.

Within the setup of FIG. 3, reliance was made upon the ACMs available to an agent to track his status for actions to be taken, such as the forwarding of incoming calls to him at times when he is available. In the setup of FIG. 4, the agent's state is tracked at his location on his computer, which state is mirrored to any ACMs to which he might have connected. This is performed through an arbitrator 113, which coordinates the communication of agent state to both processes operating interfaces 111 and any connected ACMs. This may be performed in the following manner.

Upon initialization of agent computer 110, an arbitrator program may be loaded and run. Under this mode of initialization, the arbitrator program is pre-installed to the agent computer. However this need not be the case, as the arbitrator program might be downloaded at runtime from, for example, server 109. This could be through manual action by an agent, or by an automatic execution when a first window 111 is called up. It is preferred, however, that the arbitrator program not be a sub-process of any process operating through windows 111, so that if one of those window process terminates the arbitrator need not be restarted.

As windows 111 and their associated processes 112 are started, each process tests for the presence of an arbitrator 113. If one is present, a window process may communicate with arbitrator 113, both informing the arbitrator of status relative to its own window and querying status relative to others as will become clear from the discussion below. In one example, the arbitrator communicates with window processes through socket-based communication available on many window-based platforms. Further in that example, window processes 112 are generated underneath a web browser having an interpreter incorporated therein. Thus, each window 111 can be an independent web-browser window, each accessing a server 109 to initiate call center operations. In response to such accessing, server 109 can return an executable object, for example in Javascript, that initiates a window-process 112. That window-process then generates an interface for the agent within the browser window, coordinating activities with other processes running under other browser windows, tabs or other separations. Again, the execution of the object obtained from server 109 could test for the presence of an executing arbitrator, and start up one if one is not detected. Alternatively, the executing server object could simply recognize that an arbitrator is not available, and interact directly with any connected ACMs or remote objects as needed relying upon agent state tracking elsewhere.

In the present example, communication between window processes 112 and the arbitrator 113 is polled, that is initiated by the window processes both to inform the arbitrator of state changes and to request state maintained there. This may provide for simplified programming and operation, however if desired a setup could be configured to push communication from the arbitrator to the window processes.

In run-time operation, window processes 112 may keep windows 111 updated for the benefit of the local agent. For example, if an agent is operating two windows 111a and 111b as shown, each window would recognize and show his status. Thus, if he was on a call associated with one of the windows, the other window could recognize and show that a call was taking place. If the agent was taking a break or was otherwise unavailable, each of the windows could recognize that fact by regularly polling the arbitrator. ACMs interacting with an agent's computer 110 would interact with both window processes and any operating arbitrator, as follows.

At various times, windows 111 would be updated to reflect the current call-center activity. This might involve the updating of contacts shown and the activities involving those contacts, for example. As in a system without an arbitrator, window processes 112 would communicate directly with ACMs using ordinary network communications, particularly for informational displays that are not directly affected by the local agent's status.

However, the agent can benefit from the arbitrator in several ways. First, the agent's state with respect to one window can be propagated to the others. For example, the agent may initiate a telephone call to a contact displayed in window 111a, and may so command through interaction with that window and interface 106. Associated application 112a would receive the user's command, and provide necessary ACM interaction. To keep other applications 112 informed of this activity, application 112a sends a packet to arbitrator 113 notifying that a call is in progress. When the call is completed, the ACM involved notifies associated window process 112a, which then sends another packet to arbitrator 113 to recognize the agent's new state as not on a call for the benefit of other processes 112. As commands are received by window processes 112 to initiate new calls, queries can be made to arbitrator 113 to ensure that such commands are not accidental.

For incoming calls, each window process 112 receives notification from an associated ACM. Upon notification of an incoming call, a window process can query arbitrator 113 as to the status of the agent. If that status is on a call, the window process can so inform the ACM and the incoming call directed to another agent. Otherwise, the call can be routed to the local agent for handling. In another alternative, an ACM could communicate with an arbitrator 113 directly if provision is so made.

Now it is to be understood that the setup of FIG. 4 may be varied in accordance with the operating system, available applications including web-browsers and interpreters, and other details of computers and terminals available for use by persons who can act as call center agents. Thus, either of window processes 112 or arbitrator 113 could be implemented through browser plug-ins. Changes to agent state can be initiated via requests that come in through such a plug-in, through direct interaction with the arbitrator or from a server-side request. Such state changes could then be broadcast to each plugin, and the updated state information relayed to the browsers to update the displays of the associated web pages to reflect those changes. A window process might also utilize a more feature-filled language; for example the objects delivered for such processes might utilize Shockwave Flash. The master record of agent state can be located to arbitrator 113, but alternatively this could be located to an ACM and accessed by arbitrator 113 as needed. The keeping of the master record of agent state at an ACM allows for a direct query from a SIP server to an ACM to identify an agent who is presently available without a potentially extended procedure to locate an available agent through a list of many who might be otherwise occupied.

The status of an agent can include more than merely whether or not he is presently on a call, but can also include other status such as whether that call is inbound or outbound, whether he is available or taking a break, informational items such as the agent's telephone number or station, and rules regarding the agent's behavior or interaction, such as whether the agent is allowed to be in certain groups.

A system employing multiple agents can also utilize an automated call distribution system that evaluates the suitability of the agents presently available, assigning incoming calls to those best suited to handle them. For incoming calls, a new URL may be created for a contact by the distribution system or another component, which may then be forwarded to the agent through an available window process giving him the information needed to handle the call.

Figure 12:
FIG. 12 shows an exemplary interaction window.

A specific user interface will now be described utilizing techniques and systems described above. Now turning to FIG. 12, the exemplary interface incorporates a tabular display built substantially within a web browser interface, one exemplary tab and screen being shown in the Figure as would be seen by an agent in the course of his contact work. Incorporated within that screen is a menu bar allowing for the agent to perform management of accounts, cases, contacts, leads, opportunities and reports, as well as other items surrounding his work. The remainder of the display is subdivided into a left summary area, a central list of contacts, and an interaction window displayed to the right, a close-up being shown in FIG. 5. The view shown in FIG. 12 is that for an agent not presently logged in, and thus the screen provides notification of the "disconnected" state of the interface at the top of the summary area. In this state, the agent can enter a username, password, security token and a phone number personal to him, which upon validation will allow further operation.

Figure 13:
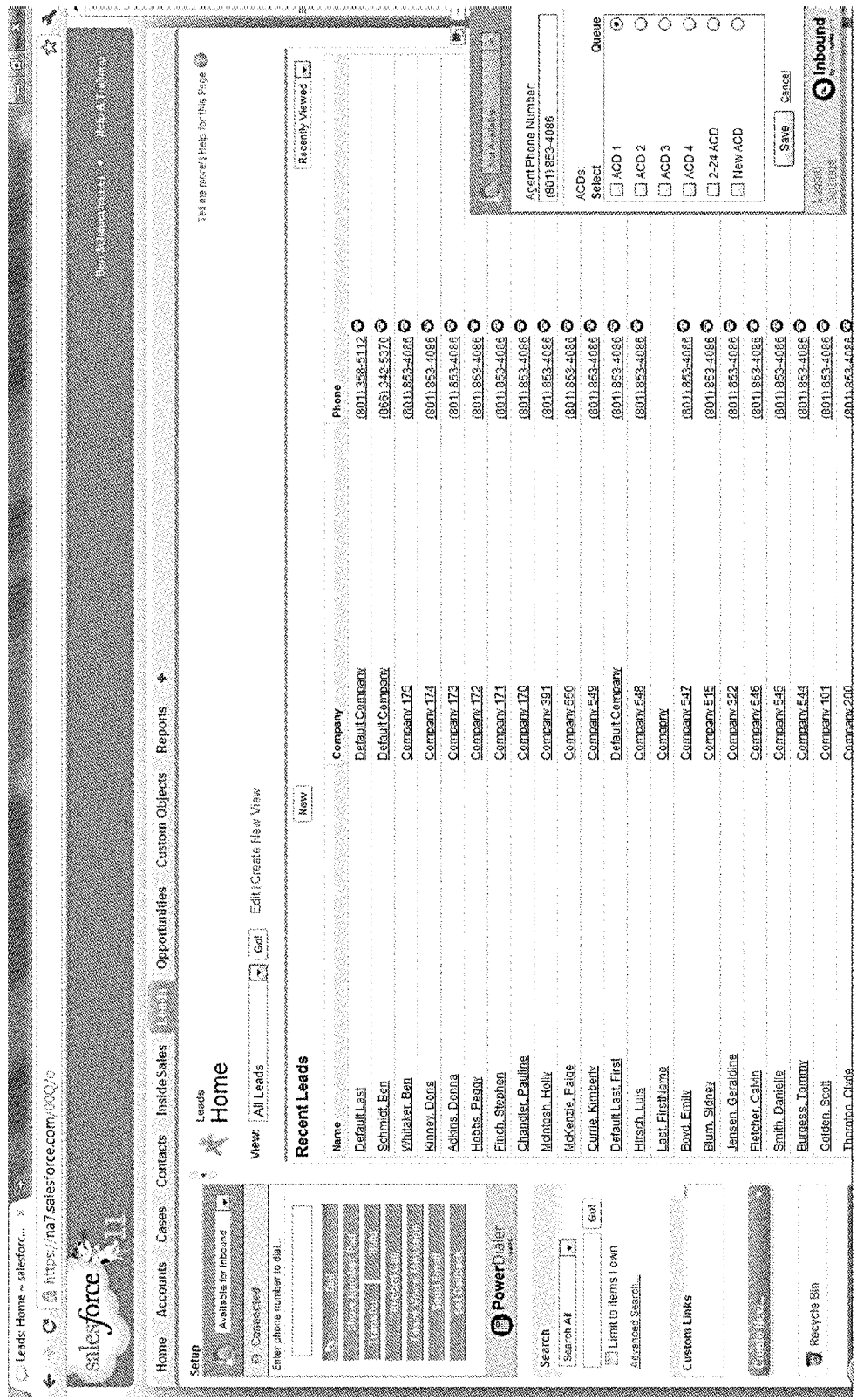
FIG. 13 shows an exemplary interaction window.

When an agent has logged in, he is presented with a display as shown in FIG. 13. The summary then displays him as "connected", meaning that he is connected to the larger call center system. At this point, the agent is presented with a list of ACMs to select, as shown in the interaction window or as shown in close-up in FIG. 6. The agent may select the ACMs he is to have interaction with, and then save his selections for further operation. Also in the interaction window in this state, the agent may select one ACM for display of his position in its queue, which will become more apparent below.

Figure 14:
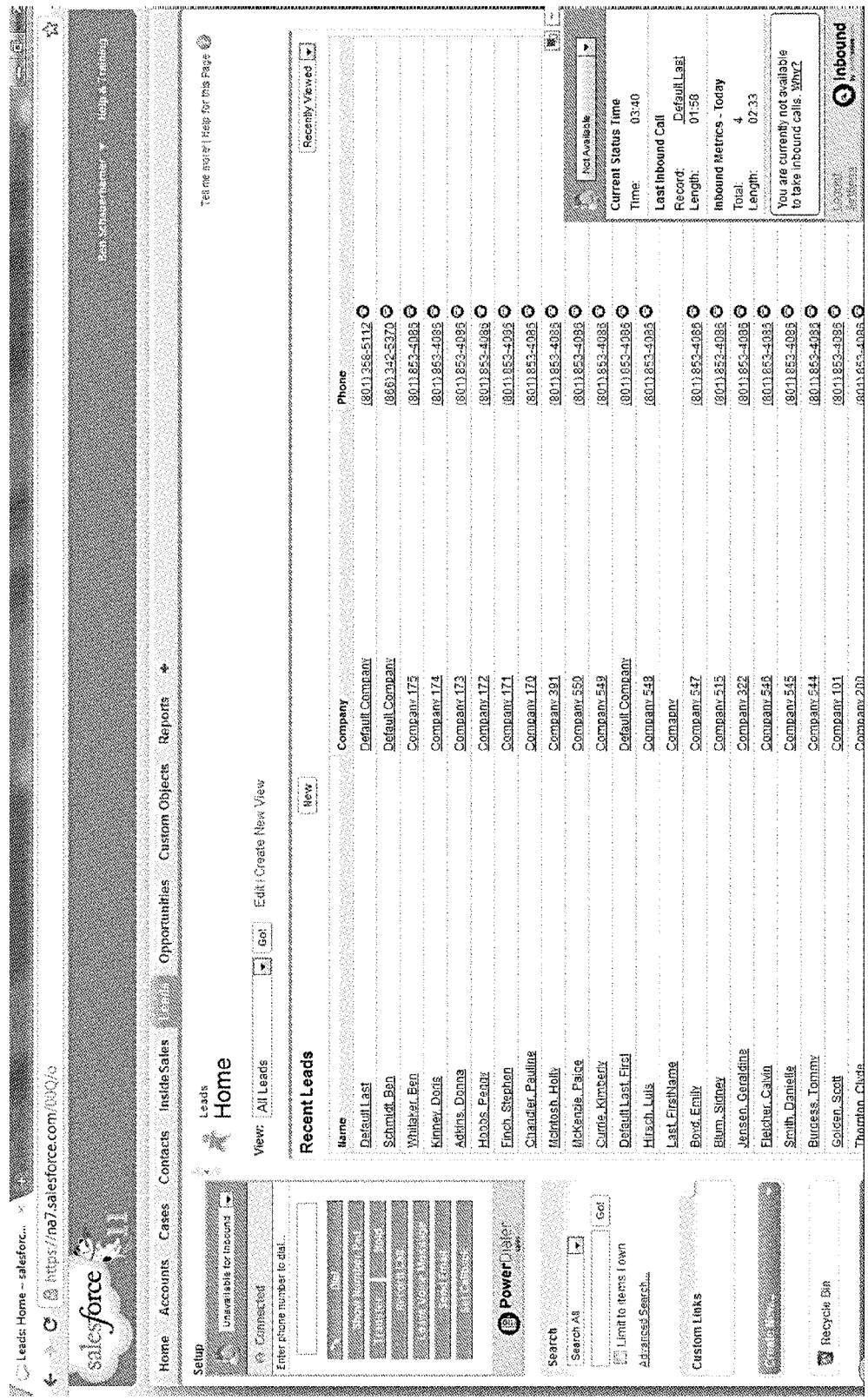
FIG. 14 shows an exemplary interaction window.

Upon selection of ACMs, the agent is presented with a screen as shown in FIG. 14. Here, the interaction window displays the current status time, information concerning the last inbound call handled, the total number of inbound calls taken that the total length of time in which the agent was engaged in the handling of those inbound calls. As seen in the close-up in FIG. 7, the interaction window also informs the agent that his status is that he is not presently available to take inbound calls. Looking back to the top of the summary area shown in FIG. 14, this is because his initial selection is unavailable for inbound calls.

Figure 15:
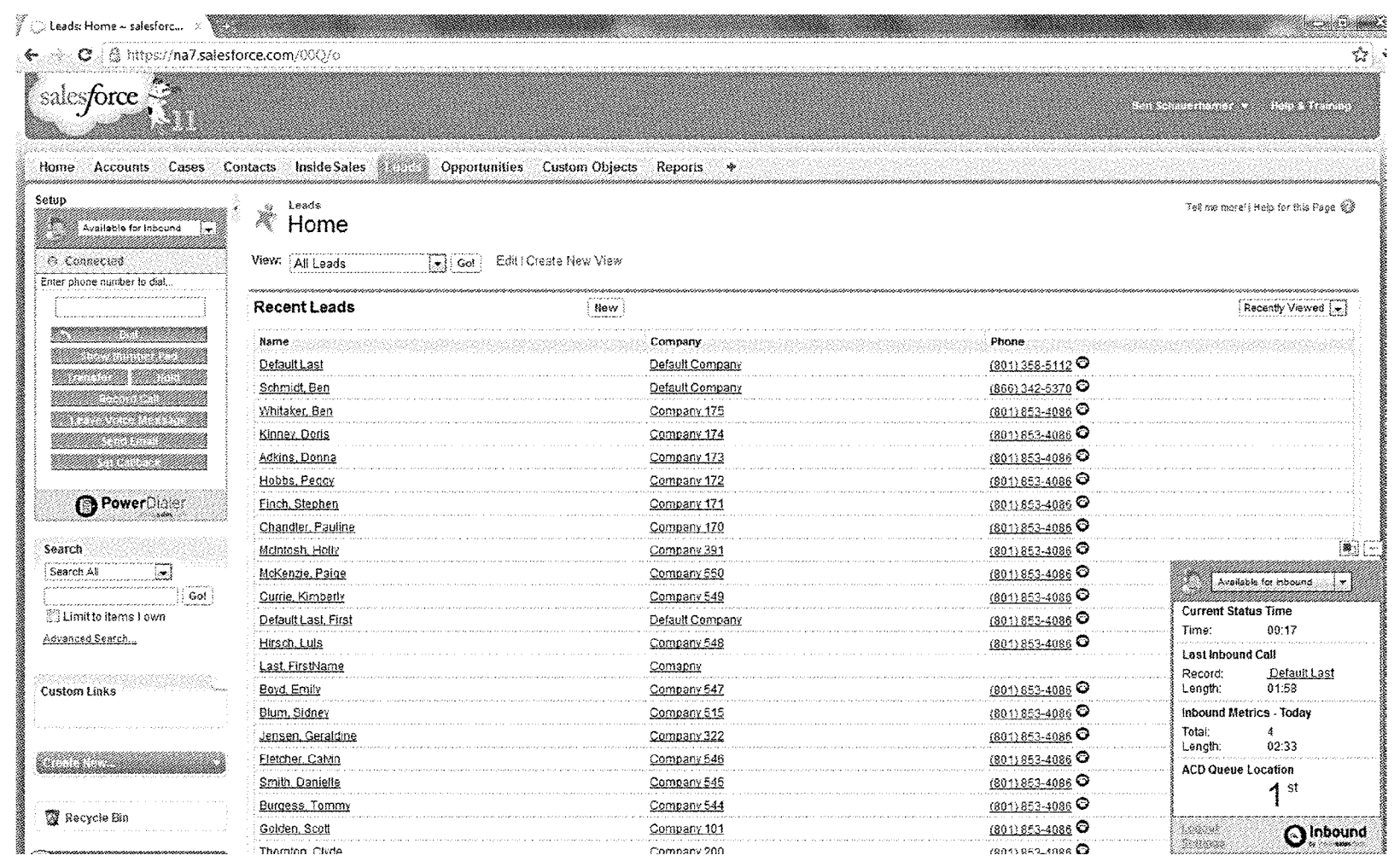

Upon changing his status to available, the agent then sees a window as shown in FIG. 15. The interaction window then shows his location in the interaction queue, which as can be seen in the close-up of FIG. 8, this agent is queued to receive the next inbound call.

Figure 16:
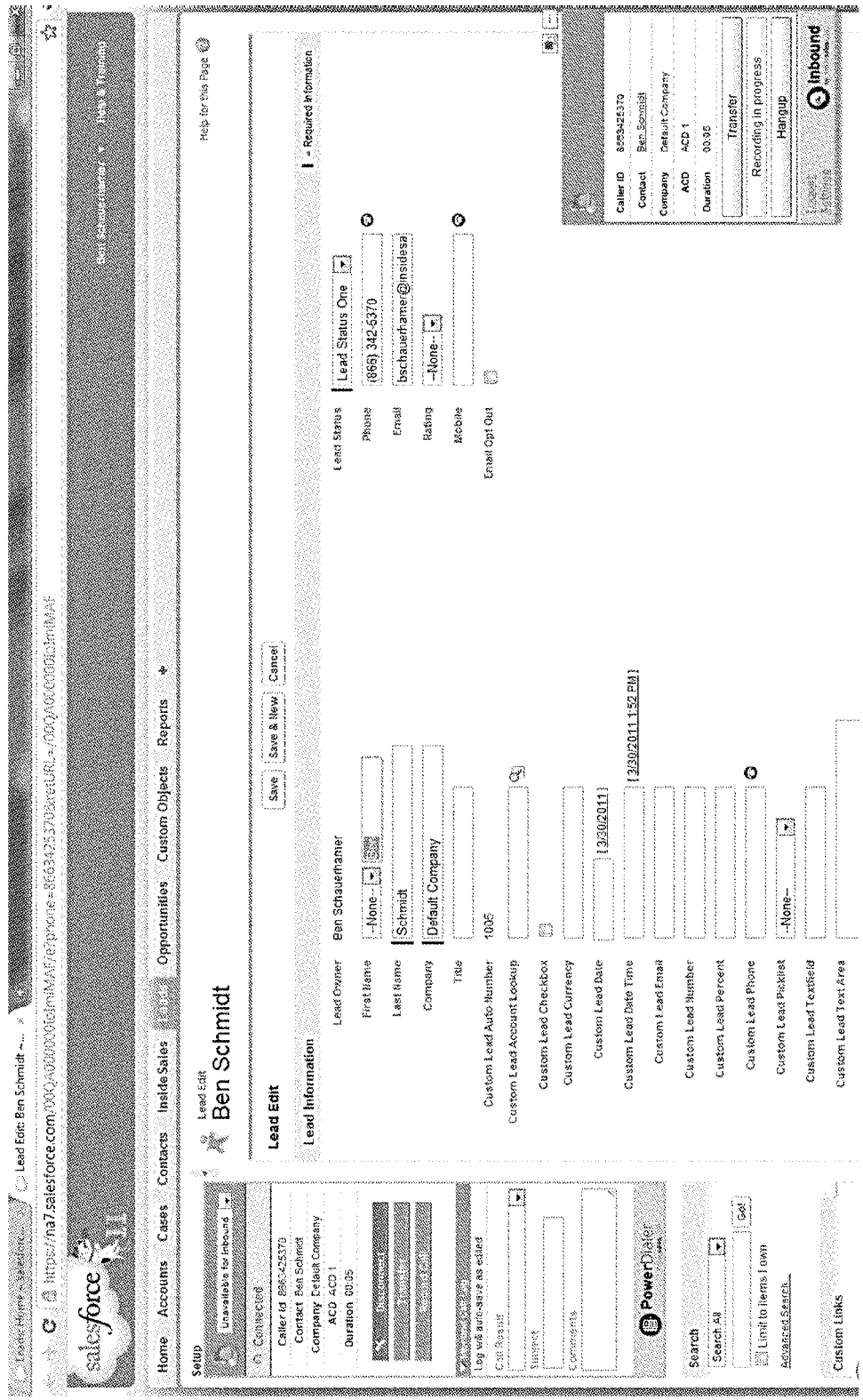
FIG. 16 shows an exemplary interaction window.

Upon receipt of an inbound call, the agent then sees a window as shown in FIG. 16. The central display changes to a focus on the caller, allowing for the display and entry of information specific to him for the use of the agent on the call. The interaction window, as seen in the close-up of FIG. 9, displays summary information about the call as well as providing the agent buttons to transfer, record or hang-up the call in progress.

Figure 17:
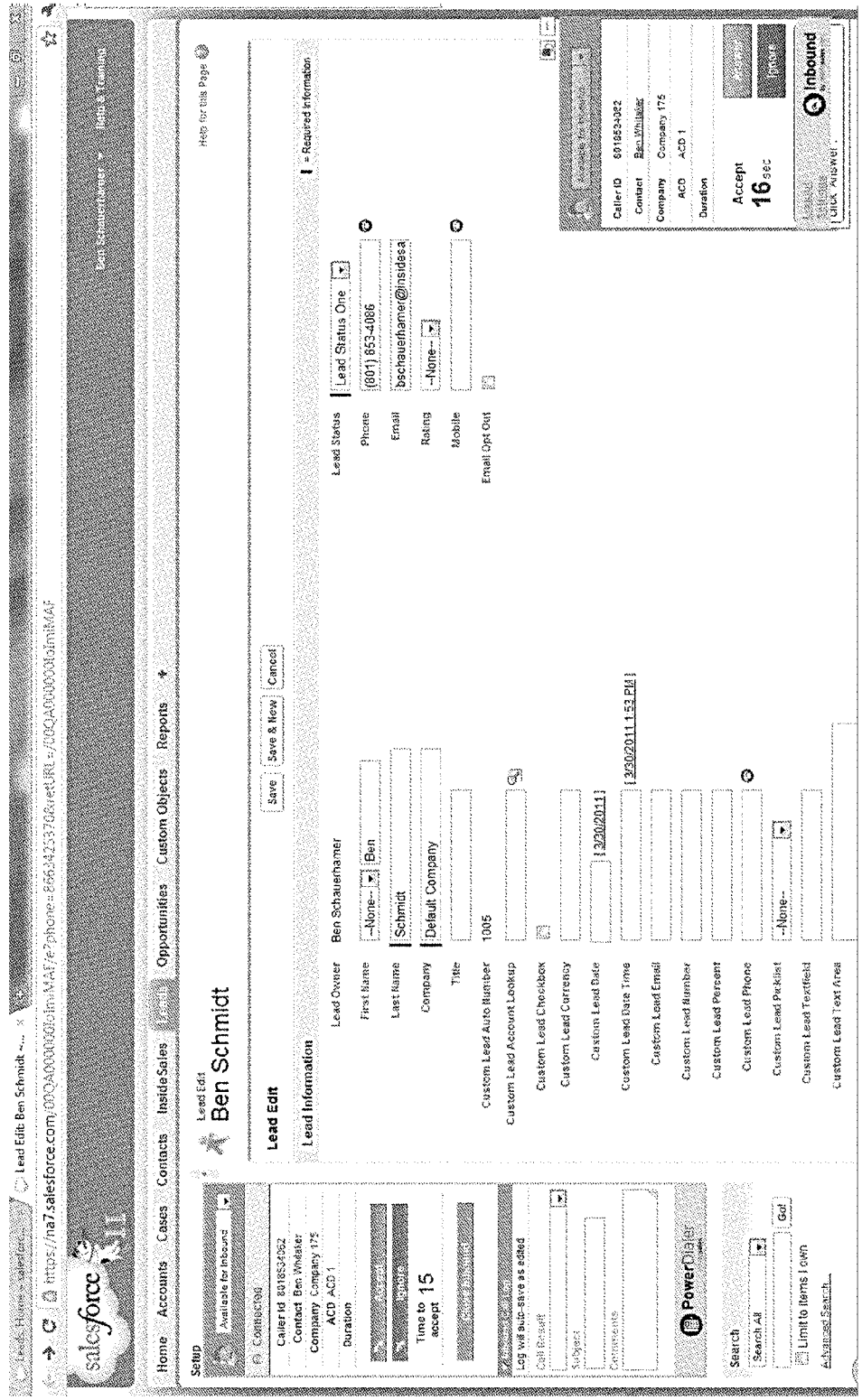
FIG. 17 shows an exemplary interaction window.

Now turning to FIG. 17, it might be the case that an incoming call arrives at a time when the agent is presently engaged in an outbound call. In this example, a Ben Whitaker is calling in while an agent is conversing with a Ben Schauerhamer. As seen in the interaction window, the agent is provided the identity of the incoming caller and the buttons to answer or ignore the incoming call.

Figure 18:
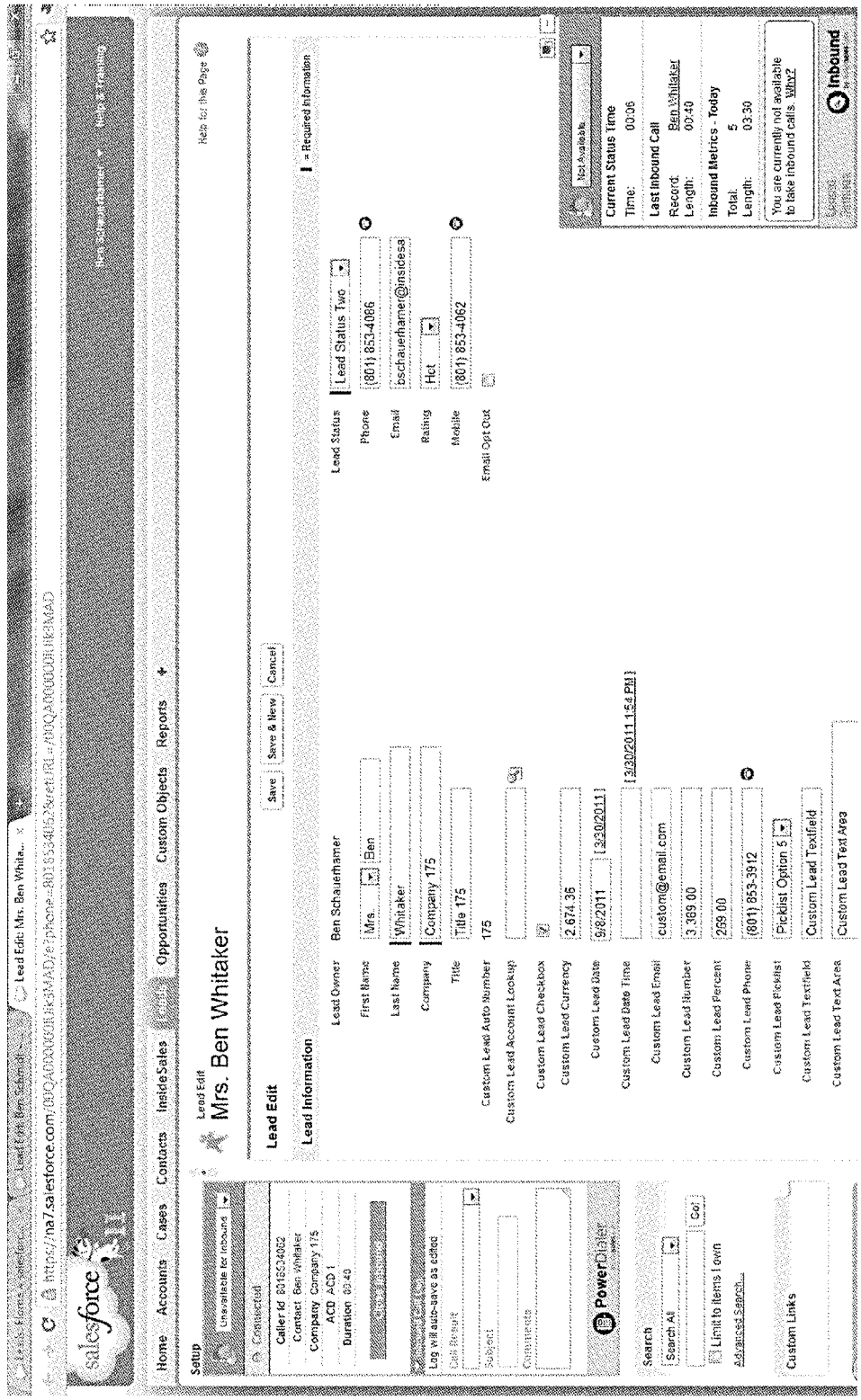
FIG. 18 shows an exemplary interaction window.

In the system producing this exemplary interface, agent status is ordinarily set to "not available" to allow for the finishing of the handling of the call, for example entering notes and other information into the contact database. After an agent has finished an inbound call, he sees a window as shown in FIG. 18, which is much like the displays of FIGS. 14 and 7 except that the entry/informational display for the previous caller is maintained until dismissed by the agent.

Figure 19:
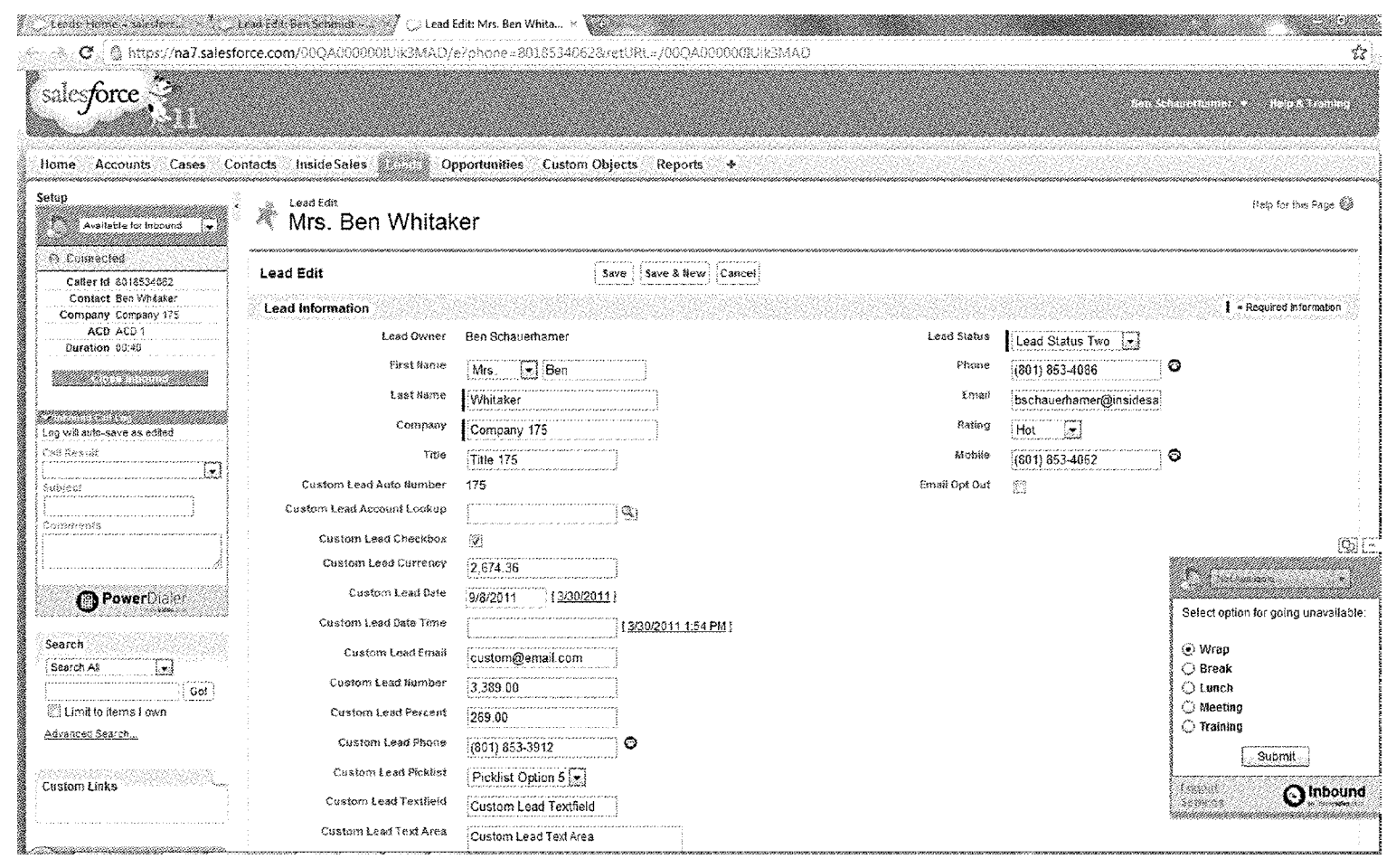

Now it may be that the agent wishes to notify that he is "not available", and may so do using the pull-down list in either the interaction window or in the summary area. Upon doing so, he sees a window as shown in FIG. 19, upon which the agent is presented with a selection of a reason for his non-availability, also as seen in the close-up of the interaction window in FIG. 10. Here, the agent is given the choice of indicating that he is wrapping up his session, taking a break, going to lunch, going to a meeting, or participating in training. An agent may also customize what the interface presents to him, by clicking on the "settings", changing the interaction window to that of FIG. 11.

The interface of FIGS. 5-19 can be utilized with a setup having an arbitrator, by displaying the status of the agent maintained thereon or therethrough. Thus, if an agent were to keep multiple browser contact windows up on his screen, they would all reflect his state as known to the arbitrator. Similarly, a change in his status as commanded in one window, such as going to "not available", would be reflected in the other windows. Upon receipt of an incoming call directed to a particular window of several, that window would correctly be set to either that of FIG. 16 or 17, depending upon whether a call was in progress in any of his windows, based upon a query of status available to the arbitrator at the time the call came in. In this manner, an agent can have multiple contact windows or tabs open, while maintaining the correct operation of each based upon his true state.

Now although certain systems, products, components, functions and methods have been described above in detail, one of ordinary skill in the art will recognize that these functions and methods are adaptable to other systems and products that utilize call-center equipment. Likewise, although the described functions have been described through the use of block diagrams, flowcharts, software and hardware descriptions, one of ordinary skill in the art will recognize that most of the functions described herein may be implemented in software or hardware. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A call processing system allowing for the assignment of agents to a plurality of automated call managers whereby each assigned agent can practice predefined dialog with distant parties for more than one activity database, each activity database managed in conjunction with one of the plurality of automated call managers and including a unique set of informational types related to an activity for which the automated call manager is being utilized for, said system comprising:
   a plurality of telephonic sets in different agent locations, each telephonic set being operable for a two-way audio conversation between a call-center agent and a distant party in a telephone network, each telephonic set being further operable to receive forwarded calls from an automated call manager;
   a data network providing for the communication of data between network devices;
   one or more database servers providing over said data network contact databases containing the identities of individual persons and their addresses, each of said contact databases optionally including other items of information relating to these persons such as a name, a history, a reputation, and other information related to the activity to which said telephonic sets are being utilized for;
   a plurality of automated call managers available as network devices over said data network, each automated call manager being operable to receive incoming communications from distant parties and forward these incoming communications to call service agents, each automated call manager including ACM processing facilities for executing software, each automated call manager further including facilities to contain operating system files and applications, each automated call manager further including an ACM storage device group containing at least one non-transitory storage device having stored thereupon instructions executable by said ACM processing facilities of one of said automated call managers to achieve the functions of:
   (i) establishing and maintaining a plurality of links of communication with agents each operating an agent terminal over said data network,
   (ii) pairing a communications link with one of said agent terminals with one of said plurality of telephonic sets,
   (iii) receiving notifications of the availability and unavailability of agents operating agent terminals,
   (iv) tracking the state of availability of agents upon the basis of received notifications,
   (v) managing incoming telephone communications,
   (vi) selecting a telephonic set to forward an incoming telephone communication, said selection being made on the basis of the state of the availability and unavailability of agents and on pairings made between agent terminals and telephonic sets,
   (vii) forwarding incoming telephone communications to selected telephonic sets,
   (viii) accessing said contact databases to produce information of an identity, said accessing utilizing an address produced by a telephone network of an incoming caller,
   (ix) communicating the produced identity of an incoming caller to the agent terminal paired with the selected telephonic set to which an incoming call is being forwarded, and
   (x) communicating with an agent terminal in a predefined ACM-specific activity, this communication including the transfer of items of information for an activity database managed in conjunction with one of said automated call managers;
   optionally, a server providing for on-line delivery of information, said server including a server storage device group containing at least one non-transitory storage device of information; and
   a plurality of agent terminals available as network devices over said data network, each agent terminal being located in proximity to one of the plurality of telephonic sets, each agent terminal including agent processing facilities for executing software, each agent terminal further including a display and an input device, each agent terminal further including an agent storage device group containing at least one non-transitory storage device operable to contain operating system files and applications, the set of storage device groups within said call processing system having stored thereupon instructions executable by said processing facilities of one of said agent terminals to achieve the functions of:
   (xi) recognizing the identity of an agent,
   (xii) operating an arbitrator for a recognized agent,
   (xiii) establishing a relationship over said data network between a recognized agent and an automated call manager for reception of incoming communications from distant parties to one of said telephone sets positioned for use by the recognized agent located at said agent terminal,
   (xiv) maintaining the state of a recognized agent as to his availability for assignment of an incoming telephone call, (xv) receiving assignments of incoming telephone calls for a recognized agent from automated call managers for which a relationship has been established, (xvi) where an assignment of an incoming telephone call is received, updating the state of the recognized agent for which the assignment was received, (xvii) through the arbitrator, notifying processes operating on said data network having established relationships between said automated call managers and a recognized agent of his unavailability, where an assignment of an incoming telephone call was received for that agent, (xviii) transferring items of activity-specific information for activity caused by an automated call manager making an assignment, (xix) where an assignment of an incoming telephone call is completed, updating the state of the recognized agent for which the assignment was received, and (xx) through the arbitrator, notifying processes operating on said data network having established relationships between said automated call managers and a recognized agent of his availability, where an assignment of an incoming telephone call was completed for that agent.

2. A call processing system according to claim 1, wherein said storage device groups within said call processing system have stored thereupon instructions executable by said processing facilities of one of said agent terminals to achieve the functions of:

(xxi) through the arbitrator, notifying automated call managers for which a relationship has been established with a recognized agent of his availability and unavailability as assignments are received and completed.

3. A call processing system according to claim 1, wherein said storage device groups within said call processing system have stored thereupon instructions executable by said processing facilities of one of said agent terminals to achieve the functions of:

(xxi) displaying the identity of assigned incoming callers as received from an automated call manager.

4. A call processing system according to claim 1, wherein said storage device groups within said call processing system have stored thereupon instructions executable by said processing facilities of one of said agent terminals to achieve the functions of:

(xxi) upon startup of the arbitrator, querying for the presence of other running arbitrators for a recognized agent, and stopping the arbitrator being started if such querying shows an arbitrator already running for that recognized agent.

5. A call processing system according to claim 1, wherein said storage device groups within said call processing system have stored thereupon instructions executable by said processing facilities of one of said agent terminals to achieve the functions of:

(xxi) receiving from a recognized agent the specification of one of said telephonic devices, and (xxii) transmittal of a received selection of a telephonic device to an automated call manager for which a relationship has been or is being established with a recognized agent.

6. A call processing system according to claim 1, wherein each automated call manager further includes a database of dialog, and wherein said ACM storage device group of said automated call managers further have stored thereupon instructions executable by said ACM processing facilities of one of said automated call managers to achieve the function of delivering to an agent computer upon assignment of an incoming call the dialog contained within said database.

7. A call processing system according to claim 1, wherein one of said automated call managers is further operable to receive a request from an agent terminal for an outbound call.

8. A call processing system according to claim 1, wherein said instructions executable by said processing facilities of one of said agent terminals are executable to achieve the function of notifying processes running on the same agent terminal as the agent terminal executing said instructions of a recognized agent's availability and unavailability.

9. A call processing system according to claim 1, wherein said instructions executable by said processing facilities of one of said agent terminals are executable to achieve the two functions of notifying processes of a recognized agent's availability and unavailability and utilizing said data network to notify processes running on a different network device than the agent terminal executing said instructions.

10. A call processing system according to claim 1, wherein said storage device groups within said call processing system have stored thereupon interpreter instructions executable by said processing facilities of one of said agent terminals to operate an interpreter, and wherein said storage device groups within said call processing system have stored thereupon arbitrator instructions executable through said interpreter instructions and configured to perform a check for a prior-running arbitrator, and further whereby said arbitrator instructions are configured to resolve conflicts between itself and other arbitrators that may be running.

11. A call processing system according to claim 10, wherein said interpreter instructions are configured for execution in conjunction with an Internet browser, and wherein said arbitrator instructions are delivered to said agent terminal over said data network.

* * * * *